US012670226B2

(12) United States Patent
Wang et al.

(10) Patent No.: US 12,670,226 B2
(45) Date of Patent: Jun. 30, 2026

(54) METHOD, APPARATUS, DEVICE AND MEDIUM FOR RENDERING PAGE COMPONENTS

(71) Applicant: Beijing Volcano Engine Technology Co., Ltd., Beijing (CN)

(72) Inventors: Haiming Wang, Beijing (CN); Yang Liu, Beijing (CN); Xuan Luo, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 191 days.

(21) Appl. No.: 18/444,125

(22) Filed: Feb. 16, 2024

(65) Prior Publication Data

US 2024/0281491 A1 Aug. 22, 2024

(30) Foreign Application Priority Data

Feb. 16, 2023 (CN) .......................... 202310168948.7

(51) Int. Cl.
| | |
|---|---|
| *G06F 3/048* | (2013.01) |
| *G06F 9/445* | (2018.01) |
| *G06F 16/957* | (2019.01) |

(52) U.S. Cl.
CPC ...... *G06F 16/9577* (2019.01); *G06F 9/44505* (2013.01)

(58) Field of Classification Search
None
See application file for complete search history.

(56) References Cited

U.S. PATENT DOCUMENTS

| | | | | |
|---|---|---|---|---|
| 2012/0288012 A1* | 11/2012 | Staikos | ................. | G06F 9/5038 |
| | | | | 375/E7.027 |
| 2014/0086034 A1* | 3/2014 | Matousek | .............. | G11B 27/36 |
| | | | | 369/53.41 |

(Continued)

FOREIGN PATENT DOCUMENTS

| | | |
|---|---|---|
| CN | 109669739 A | 4/2019 |
| CN | 111538885 A | 8/2020 |

(Continued)

OTHER PUBLICATIONS

First Office Action for Chinese Application No. 202310168948.7, mailed on Dec. 7, 2024, 23 pages.

*Primary Examiner* — Thanh T Vu
(74) *Attorney, Agent, or Firm* — Astute IP Law Group

(57) ABSTRACT

The present application discloses a method, apparatus, device and medium for rendering page components. When a target page needs to be loaded, rendering data corresponding to at least one pending component in the target page is obtained, and a rendering request corresponding to the at least one pending component is added to a scheduling queue. A rendering request of a target pending component is read from the scheduling queue according to the position of the at least one pending component in the target page, and further the target rendering component is rendered according to rendering data corresponding to the target pending component in the rendering request. That is, when rendering components in a page, the rendering order between various components will be coordinated according to the position of the component in the page, thereby avoiding the problem of buffering when too many components are rendered at the same time.

17 Claims, 3 Drawing Sheets

(56)          References Cited

U.S. PATENT DOCUMENTS

| 2015/0198992 A1* | 7/2015 | Kumar | ..................... | G06F 9/5094 |
| | | | | 713/320 |
| 2020/0125683 A1* | 4/2020 | Hajduczenia | ....... | G06F 3/04842 |
| 2024/0086034 A1* | 3/2024 | Gupta | ..................... | G06F 3/0484 |

FOREIGN PATENT DOCUMENTS

| CN | 111931472 A | 11/2020 |
| CN | 112182452 A | 1/2021 |
| CN | 112784200 A | 5/2021 |
| WO | 2017124961 A1 | 7/2017 |

* cited by examiner

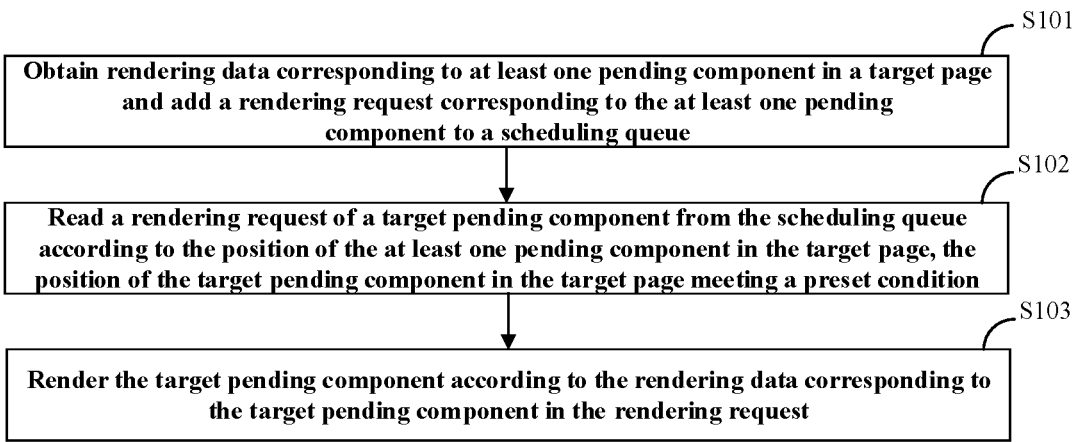

S101

Obtain rendering data corresponding to at least one pending component in a target page and add a rendering request corresponding to the at least one pending component to a scheduling queue

S102

Read a rendering request of a target pending component from the scheduling queue according to the position of the at least one pending component in the target page, the position of the target pending component in the target page meeting a preset condition

S103

Render the target pending component according to the rendering data corresponding to the target pending component in the rendering request

FIG. 1

METHOD, APPARATUS, DEVICE AND MEDIUM FOR RENDERING PAGE COMPONENTS

CROSS REFERENCE TO RELATED APPLICATIONS

This application claims priority to CN Application No. 202310168948.7, filed Feb. 16, 2023, and titled "METHOD, APPARATUS, DEVICE AND MEDIUM FOR RENDERING PAGE COMPONENTS", the disclosure of which is incorporated herein by reference in its entirety.

FIELD

The present disclosure relates to the technical field of computers, and in particular, to a method, apparatus, device and medium for rendering page components.

BACKGROUND

When rendering a page in a browser, each individual element in the page is called a component. When too many components are rendered in the page at the same time, the components contend with each other for limited resources. If the computing and storage resources are insufficient, it is easy to cause buffering in the device or browser.

SUMMARY

In view of the above, the present disclosure provides a method, apparatus, device and medium for rendering page components, so as to optimize the component rendering in the page and avoid buffering in the page.

To achieve the foregoing objective, the present disclosure provides a technical solution as below:

In a first aspect of the present disclosure, a method for rendering page components is provided, the method comprising:

obtaining rendering data corresponding to at least one pending component in a target page and adding a rendering request corresponding to the at least one pending component to a scheduling queue, the rendering request comprising the rendering data;

reading a rendering request of a target pending component from the scheduling queue according to the position of the at least one pending component in the target page, the position of the target pending component in the target page meeting a preset condition;

rendering the target pending component according to the rendering data corresponding to the target pending component in the rendering request.

In a second aspect of the present disclosure, an apparatus for rendering page components is provided, the apparatus comprising:

a first obtaining unit, used for obtaining rendering data corresponding to at least one pending component in a target page and adding a rendering request corresponding to the at least one pending component to a scheduling queue, the rendering request comprising the rendering data;

a second obtaining unit, used for reading a rendering request of a target pending component from the scheduling queue according to the position of the at least one pending component in the target page, the position of the target pending component in the target page meeting a preset condition;

a rendering unit, used for rendering the target pending component according to the rendering data corresponding to the target pending component in the rendering request.

In a third aspect of the present disclosure, an electronic device is provided, the electronic device comprising: a processor and a memory;

The memory is used for storing instructions or computer programs;

The processor is used for executing the instructions or computer programs stored in the memory to cause the electronic device to perform a method as described in the first aspect.

In a fourth aspect of the present disclosure, a computer readable storage medium is provided, with instructions stored therein which, when running on a device, cause the device to perform a method as described in the first aspect.

In a fifth aspect of the present disclosure, a computer program product is provided, comprising computer programs/instructions which, when executed by a processor, performing a method as described in the first aspect.

Apparently, the present disclosure has the following advantageous effects:

In the present disclosure, when a target page needs to be loaded, rendering data corresponding to at least one pending component in the target page is obtained, and a rendering request corresponding to the at least one pending component is added to a scheduling queue. One pending component corresponds to one rendering request, which comprises rendering data corresponding to the pending component. A rendering request of a target pending component is read from the scheduling queue according to the position of the at least one pending component in the target page, and further the target rendering component is rendered according to rendering data corresponding to the target pending component in the rendering request. The position of the target pending component in the target page meets a preset condition. That is, in the present application, when rendering components in a page, the rendering order between various components will be coordinated according to the position of the component in the page, thereby avoiding the problem of buffering when too many components are rendered at the same time.

BRIEF DESCRIPTION OF THE DRAWINGS

To illustrate the technical solution in the embodiments of the present disclosure or the prior art more clearly, a brief introduction is presented below to the accompanying drawings used in the description of the embodiments or the prior art. Obviously, the accompanying drawings in the following description are merely some embodiments in the present disclosure. For those of ordinary skill in the art, they may further obtain other drawings from these accompanying drawings without the exercise of any inventive skill.

FIG. 1 shows a flowchart of a method for rendering page components provided by an embodiment of the present disclosure;

DETAILED DESCRIPTION OF EMBODIMENTS

Figure 2:
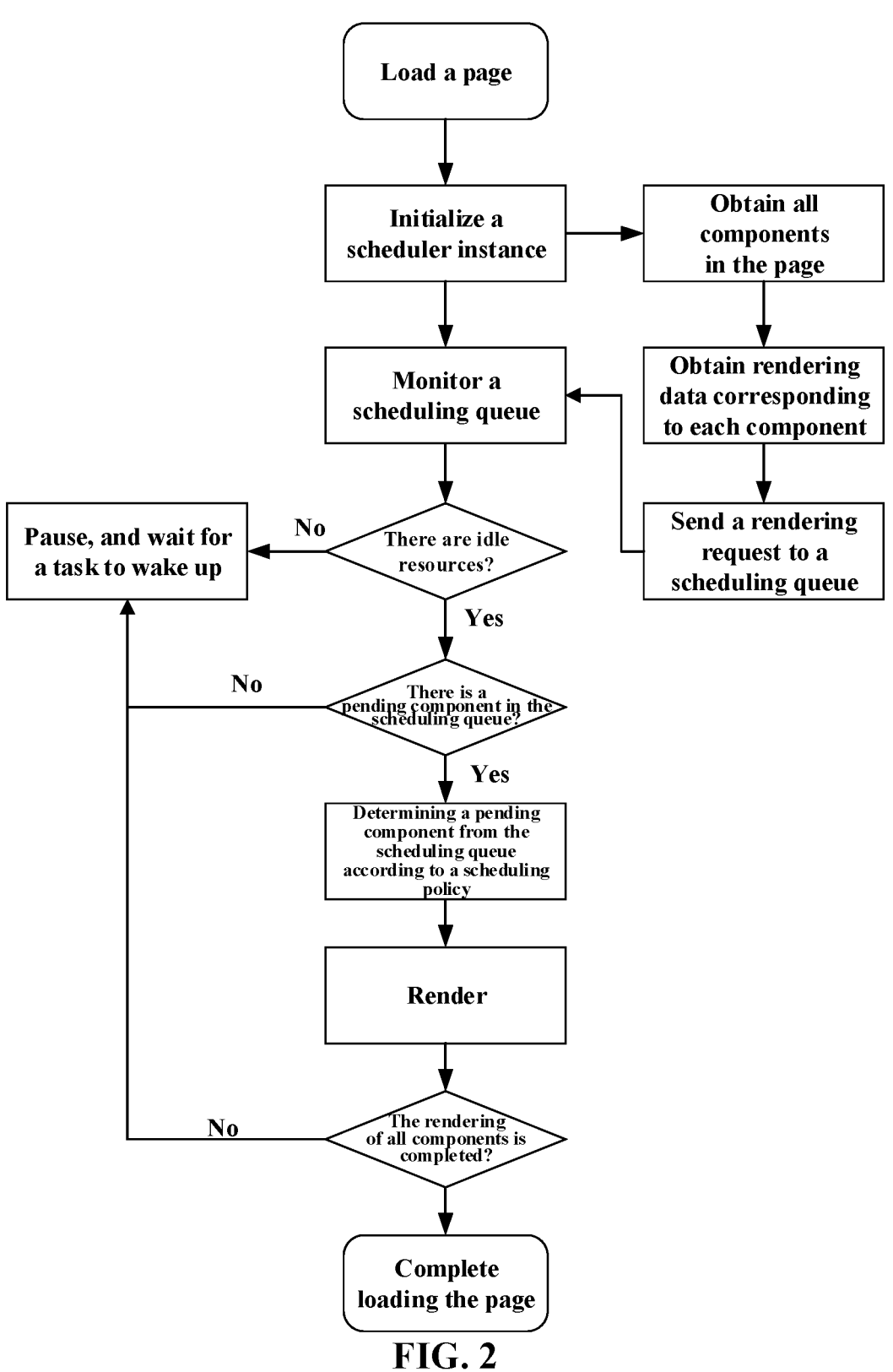
FIG. 2 shows a schematic diagram of a framework for rendering page components provided by an embodiment of the present disclosure.

In order to enable those skilled in the art to better understand the solution of the present disclosure, a clear and complete description is presented below to the technical solution in the embodiments of the present disclosure in conjunction with the accompanying drawings therein. It is apparent that the embodiments to be described are merely part of rather than all of the embodiments of the present disclosure. All other embodiments obtained by those of ordinary skill in the art without the exercise of inventive skill based on the embodiments of the present disclosure fall within the protection scope of the present disclosure.

To solve the problem that when more components are rendered on a page at the same time, the components contend with each other for resources, leading to buffering in the device or browser when resources are insufficient, the present application provides a method for rendering page components, which can improve the rendering efficiency of the components and avoid the occurrence of buffering by coordinating the rendering order between various components and equalizing the occupation of limited resources. Specifically, after obtaining rendering data corresponding to at least one pending component in a target page, a rendering request order corresponding to the pending component is added to a scheduling queue. When starting to render components, the rendering request of the target pending component will be read from the scheduling queue according to the position of the rendering request corresponding to the pending component in the target page, and then the target pending component will be rendered. The position of the target pending component meets a preset condition. That is, the present application will coordinate the rendering order between various pending components according to their positions in the target page and prioritize the rendering of pending components that meet the preset condition, in order to avoid the occurrence of buffering as too many components contend for priority resources when they are rendered at the same time.

For the sake of the understanding of the technical solution provided by the present disclosure, the process of training an expression migration model will be first explained below.

With reference to FIG. 1, this figure is a flowchart of a method for rendering page components provided by an embodiment of the present disclosure. The method may be performed by a client, which may be deployed in an electronic device. The electronic device may include a device with communication functionality such as a mobile phone, a tablet, a laptop, a desktop computer, an on-board terminal, a wearable electronic device, an all-in-one computer and a smart home device, and other device that may be simulated by a virtual machines or simulator. As shown in FIG. 1, the method may comprise the following:

S101: obtaining rendering data corresponding to at least one pending component in a target page, and adding a rendering request corresponding to the at least one pending component to a scheduling queue.

In this embodiment, when the target page needs to be loaded, all components that need to be rendered in the target page are determined, and rendering data corresponding to the various components that need to be rendered is obtained. After obtaining the rendering data corresponding to the various pending components, rendering requests corresponding to the various pending components are added to a scheduling queue. Specifically, the rendering requests may be added to the scheduling queue in the order in which the rendering data is obtained.

In some implementations, the user may load a plurality of target pages at a time, and in order to ensure the loading of various target pages, a scheduling queue is assigned to the target page before obtaining the rendering data corresponding to the at least one pending component in the target page. That is, each loaded page corresponds to one scheduling queue, thereby preventing the loading of different pages from affecting each other when a plurality of pages corresponds to one scheduling queue. Specifically, in response to the loading of a target page being triggered, a scheduler instance is created for the target page, the scheduler instance corresponding to a scheduling queue; a rendering request corresponding to at least one pending component included in the target page is added to the scheduling queue.

S102: reading a rendering request of a target pending component from the scheduling queue according to the position of the at least one pending component in the target page.

When starting to render, the rendering request of the target pending component will be read from the scheduling queue according to the position of the at least one pending component in the target page. The position of the target pending component in the target page meets a preset condition. That is, when rendering components, the rendering order between various pending components will be coordinated according to the position of each pending component in the target page and the preset condition, so as to avoid buffering due to limited resources when a plurality of components is rendered at the same time. When there exists a target pending component meeting the preset condition among the at least one pending component, the target pending component will be rendered in priority.

In some implementations, the priority and rendering order between various components may be coordinated by pre-configuring a scheduling policy. Specifically, when there are a plurality of pending components waiting to be rendered in the scheduling queue, a target pending component that will be rendered in priority may be determined from the plurality of pending components through the scheduling policy and the position of the pending component in the target page. Specifically, a rendering request of the target pending component is read from the scheduling queue according to the scheduling policy and the position of the at least one pending component in the target page. The target pending component is a pending component that is determined to be rendered in priority according to the scheduling policy.

The target page may be divided into in-viewport and out-of-viewport, the in-viewport referring to the part that the user can see and the out-of-view referring to the part that the user cannot see. Due to the limit of the display screen size, a page might not be completely displayed in the display screen, the part that will be displayed on the display screen is called in-viewport, and the part that will be displayed out of the display screen is called out-of-viewport. Based thereon, components in the page may be divided into in-viewport components and out-of-viewport components, and the user may browse out-of-viewport components by triggering scrolling, flipping pages, or switching tabs on the page.

In order to enable the user to browse in-viewport components in time when browsing the page, in-viewport components will be rendered in priority, and out-of-viewport components may be rendered in the order in which they enter the scheduling queue. Specifically, the scheduling policy may include in-viewport-first and FIFO, with the priority of in-viewport-first being higher than that of FIFO. Specifically, if in the scheduling queue there exists a rendering request of a pending component that is within the in-viewport of the target page, then the target pending component is an in-viewport component among the at least one pending component; if in the scheduling queue there does not exist a rendering request of a pending component within the in-viewport of the target page, then the target pending component is a non in-viewport component that enters the scheduling queue in priority among the at least one pending component. That is, the scheduler will adopt the viewport-first policy in priority, i.e., page components which the user can see may be rendered in priority. When the rendering of in-viewport page components has been completed, i.e., there is no more in-viewport component in the queue, then the FIFO policy is used to prioritize the rendering of components that enter the queue earlier.

Before the target pending component is determined, it may be first judged whether there are idle resources and whether the scheduling queue is empty. If there are idle resources in the scheduler and the scheduling queue is not empty, the scheduler will fetch the target pending component from the scheduling queue according to the scheduling policy. If there are no idle resources in the scheduler, the flow will pause and wait for the next task to wake up and have idle resources again to continue to process rendering requests in the scheduling queue.

During specific implementation, the target pending component as determined might include a plurality of pending components. In order to avoid the occupation of too many resources when rendering the plurality of pending components, the number of components to be rendered in parallel may be set in advance. If the determined target pending component includes a first number of pending components and the first number is more than a preset number threshold, then a preset number threshold of pending components is determined from the first number of pending components in the order of entering the scheduling queue. The preset number threshold may be determined according to the actual application situation. For example, when there currently exist 5 in-viewport components in the scheduling queue while the preset number threshold is 3, then 3 in-viewport components are determined from the 5 in-viewport components in the order in which the 5 in-viewport components have entered the scheduling queue, i.e., the FIFO order.

S103: rendering the target pending component according to rendering component corresponding to the target rendering component in the rendering request.

After the target pending component is determined, the target pending component is rendered according to a rendering request corresponding to the target pending component.

After the rendering of the target rendering component is completed, the rendering request of the target pending component is removed from the scheduling queue, and the flow continues to read a rendering request of a target rendering component from the scheduling queue according to the position of the at least one pending request in the target page until the rendering of the at least one pending component in the target page is completed. Specifically, when the rendering of the target pending component is completed, the scheduler may receive a notification of completion of component rendering, at which point the occupied computing resources may be released. At the same time, the scheduler removes the component whose rendering has been completed from the scheduling queue upon receiving the notification, and selects a next component to be rendered from the scheduling queue according to the scheduling policy.

In some implementations, if the scheduling queue is empty, the flow enters a dormant state and monitors the scheduling queue at a preset frequency. When the scheduler detects that the scheduling queue is empty while rendering, it pauses and keeps monitoring the scheduling queue at a certain frequency to see if new rendering requests are added to the scheduling queue.

It can be seen that when a target page needs to be loaded, rendering data corresponding to at least one pending component in the target page is obtained, and a rendering request corresponding to the at least one pending component is added to the scheduling queue. One pending component corresponds to one rendering request, which includes rendering data corresponding to the pending component. A rendering request corresponding to a target pending component is read from the scheduling queue according to the position of the at least one pending component in the target page, and further the target rendering component is rendered according to rendering data corresponding to the target pending component in the rendering request. The position of the target pending component in the target page meets the preset condition. That is, in the present application, when rendering components in a page, the rendering order between various components will be coordinated according to the position of the component in the page, thereby avoiding the problem of buffering when too many components are rendered at the same time.

To facilitate the understanding of the component rendering process in the present application, reference may be made to a diagram of a rendering framework shown in FIG. 2.

1. Load a page, and create and initialize a scheduler instance;
2. Obtain all components that need to be loaded in a current page, at which point the component state is initialized (Initialize);
3. Obtain rendering data corresponding to each component, at which point the corresponding state is a querying state (Querying);
4. After obtaining the rendering data of the component, send a rendering request to the rendering queue of the scheduler, at which point the flow enters a pending state (Pending);
5. When the scheduler has idle resources and the scheduling queue is not empty, the scheduler fetches rendering data of a pending component from the scheduling queue according to the scheduling policy, at which point the component enters a rendering state (Drawing). The order of judging whether there are idle resources and whether the scheduling queue has a pending component is not restricted by FIG. 2. In fact, first it may be judged whether the scheduling queue has a pending component or not, and if yes, then it may be judged whether there are idle resources;
6. After completing the rendering of the component, the occupied computing resources are released, and the component state is modified to rendering completed (Rendered).

Based on the foregoing method embodiments, an apparatus and electronic device for rendering page components provided by the embodiments of the present application will be illustrated below in conjunction with the accompanying drawings.

Figure 3:
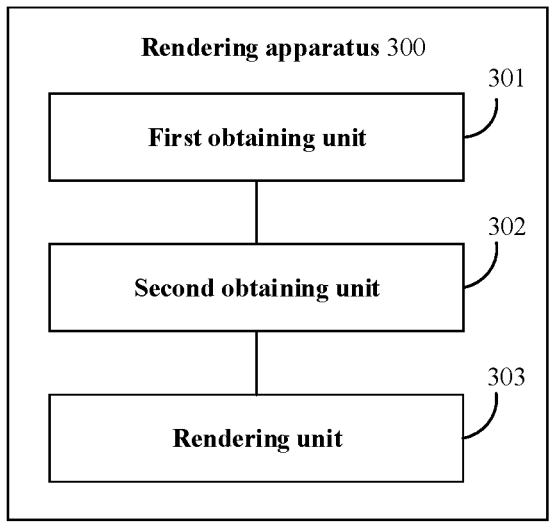
FIG. 3 shows a structural diagram of an apparatus for rendering page components provided by an embodiment of the present disclosure.

With reference to FIG. 3, this figure is a structural diagram of an apparatus for rendering page components provided by an embodiment of the present application. As depicted, the apparatus 300 may comprise: a first obtaining unit 301, a second obtaining unit 302 and a rendering unit 303.

The first obtaining unit 301 is used for obtaining rendering data corresponding to at least one pending component in a target page and adding a rendering request corresponding to the at least one pending component to a scheduling queue, the rendering request including the rendering data;

The second obtaining unit 302 is used for reading a rendering request of a target pending component from the scheduling queue according to the position of the at least one pending component in the target page, the position of the target pending component in the target page meeting a preset condition;

The rendering unit 303 is used for rendering the target pending component according to the rendering data corresponding to the target pending component in the rendering request.

In some implementations, the second obtaining unit 302 is specifically used for reading a rendering request of a target pending component from the scheduling queue according to a scheduling policy and the position of the at least one pending component in the target page, the target pending component being a pending component which will be rendered in priority as indicated by the scheduling policy.

In some implementations, the scheduling policy comprises in-viewport first and FIFO, the in-viewport first having a higher priority than the FIFO; if in the scheduling queue there exists a rendering request of a pending component within the viewport of the target page, then the target pending component is an in-viewport component among the at least one rendering component; if in the scheduling queue there does not exist a rendering request of a pending component within the viewport of the target page, then the target pending component is a non in-viewport component that enters the scheduling queue in priority among the at least one pending component.

In some implementations, the apparatus comprises: a determining unit;

The determining unit is used for, if the target pending component comprises a first number of pending components, before rendering the target pending component according to rendering data corresponding to the target pending component in the rendering request, if the first number is more than a preset number threshold, determining a preset number threshold of pending components from the first number of pending components in the order of entering the scheduling queue;

The rendering unit 303 is specifically used for rendering the preset number threshold of pending components in parallel according to rendering requests corresponding to the preset number threshold of pending components respectively.

In some implementations, the apparatus further comprises: a processing unit;

The processing unit is used for removing the rendering request of the target pending component from the scheduling queue and re-executing the second obtaining unit until the rendering of the at least one pending component in the target page is completed.

In some implementations, the apparatus further comprises: a processing unit;

The processing unit is used for, if the scheduling queue is empty, entering a dormant state and monitoring a scheduling queue at a preset frequency.

In some implementations, the apparatus further comprises: an allocation unit;

The allocation unit is used for, before obtaining rendering data corresponding to at least one pending component in a target page, allocating a scheduling queue for the target page.

It is noteworthy that the specific implementation of each unit in this embodiment may refer to the relevant description in the foregoing method embodiment. The division of units in the embodiments of the present disclosure is merely schematic and is only a logical functional division, and there may be other ways of division in actual realization. Various functional units in the embodiments of the present disclosure may be integrated in a a single processing unit, or each unit may separately and physically exist, or two or more units may be integrated in a single unit. For example, in the foregoing embodiments, the processing unit and the sending unit may be the same or different units. The foregoing integrated units may be implemented either in the form of hardware or in the form of software functional units.

Figure 4:
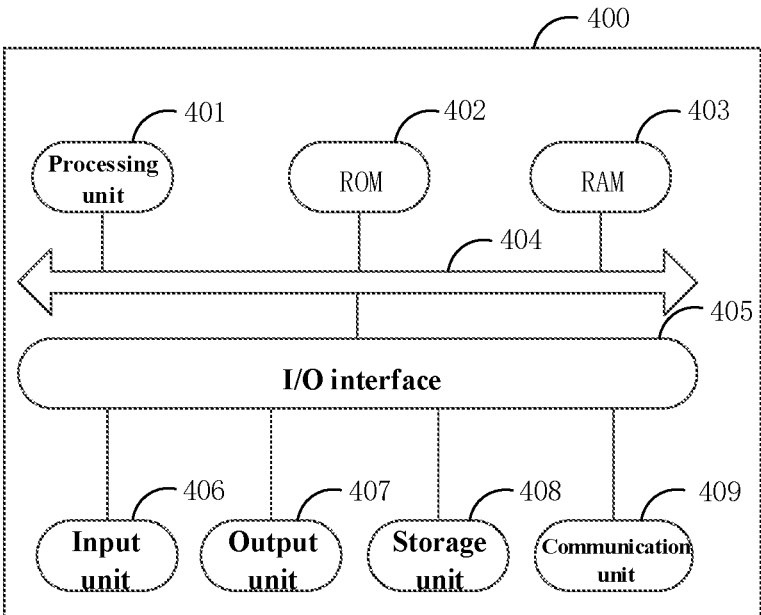
FIG. 4 shows a structural schematic diagram of an electronic device provided by an embodiment of the present disclosure.

With reference to FIG. 4, this figure shows a structural schematic diagram of an electronic device 400 which is applicable to implement the embodiments of the present disclosure. The terminal device in the embodiments of the present disclosure may include, but not limited to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 4 is merely an example and should not be construed to impose any limitations on the functionality and use scope of the embodiments of the present disclosure.

As shown in FIG. 4, the electronic device 400 may comprise a processing unit (e.g., a central processor, a graphics processor) 401 which is capable of performing various appropriate actions and processes in accordance with programs stored in a read only memory (ROM) 402 or programs loaded from a storage unit 408 to a random access memory (RAM) 403. In the RAM 403, there are also stored various programs and data required by the electronic device 400 when operating. The processing unit 401, the ROM 402 and the RAM 403 are connected to one another via a bus 404. An input/output (I/O) interface 405 is also connected to the bus 404.

Usually, the following unit may be connected to the I/O interface 405: an input unit 406 including a touch screen, a touch pad, a keyboard, a mouse, a camera, a microphone, an accelerometer, a gyroscope, or the like; an output unit 407, such as a liquid-crystal display (LCD), a loudspeaker, a vibrator, or the like; a storage unit 408, such as a a magnetic tape, a hard disk or the like; and a communication unit 409. The communication unit 409 allows the electronic device to perform wireless or wired communication with other device so as to exchange data with other device. While FIG. 4 shows the electronic device with various unit, it should be understood that it is not required to implement or have all of the illustrated unit. Alternatively, more or less unit may be implemented or exist. Each block shown in FIG. 4 may represent one unit or a plurality of unit according to needs.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication unit 409, or installed from the storage unit 408, or installed from the ROM 402. The computer program, when executed by the processing unit 401, perform the above functions defined in the method of the embodiments of the present disclosure.

The electronic device provided by this embodiment of the present disclosure and the method provided by the foregoing embodiment belong to the same inventive concept, technical details which are not detailed in this embodiment may refer to the foregoing embodiment, and this embodiment has the same advantageous effects as the foregoing embodiment.

The embodiments of the present disclosure provide a computer storage medium, on which a computer program is stored, the program, when executed by a processor, performing the method provided by the foregoing embodiment.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

In some implementations, the client and the server may communicate using any network protocol that is currently known or will be developed in future, such as the hypertext transfer protocol (HTTP) and the like, and may be interconnected with digital data communication (e.g., communication network) in any form or medium. Examples of communication networks include local area networks (LANs), wide area networks (WANs), inter-networks (e.g., the Internet) and end-to-end networks (e.g., ad hoc end-to-end networks), as well as any networks that are currently known or will be developed in future.

The above computer readable medium may be included in the above-mentioned electronic device; and it may also exist alone without being assembled into the electronic device.

The computer readable medium carries one or more programs which, when executed by the electronic device, cause the electronic device to perform the method described above.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units described in the embodiments of the present disclosure may be implemented as software or hardware. Wherein the name of a unit does not form any limitation to the module per se.

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, unit or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that in the present disclosure, "at least one" refers to one or more, and "a plurality of" refers to two or more. "And/or" is used for describing an associated relationship between associated objects, indicating that there may exist three types of relationships. For example, "A and/or B" may mean: only A, only B, and both A and B may exist, where A and B can be singular or plural. The character "/" generally indicates an "or" relationship between associated objects before and after the character. "At least one of the following" or its equivalent unit any combination of these items, including any combination of single or plural items. For example, at least one of a, b and c may indicate: a, b, c, "a and b," "a and c," "b and c," or "a and b and c," where a, b, c may be singular or plural.

Further, it is noteworthy that relational terms such as first and second are only used for distinguishing one entity or operation from another, and do not necessarily require or imply the existence of any such actual relationship or order between these entities or operations. Moreover, the terms "comprise," "include" or any other variant thereof are intended to cover non-exclusive inclusion, so that a process, method, article or equipment comprising a set of elements includes not only those elements, but also other elements that are not expressly listed or are inherent to such process, method, article or equipment. Without further limitation, an element defined by the phrase "comprising a . . . " does not exclude the existence of another identical element in the process, method, article or apparatus including the element.

The steps of the method or algorithm described in conjunction with the embodiments disclosed therein may be directly implemented by hardware, software modules executed by a processor or a combination thereof. Software modules may be placed in random memory (RAM), memory, read-only memory (ROM), electrically programmable ROM, electrically erasable programmable ROM, registers, hard disks, removable disks, CD-ROMs, or any other form of storage medium known in the art.

The foregoing description of the disclosed embodiments enables those skilled in the art to realize or use the present disclosure. Various modifications to these embodiments are apparent to those skilled in the art, and general principles defined herein may be realized in other embodiments without departing from the spirit or scope of the present disclosure. Therefore, the present disclosure will not be limited to these embodiments illustrated herein but accord with the broadest scope consistent with the principles and novel features disclosed herein.

We claim:

1. A method for rendering page components, wherein the method comprises:

obtaining rendering data corresponding to at least one pending component in a target page and adding a rendering request corresponding to the at least one pending component to a scheduling queue, the rendering request comprising the rendering data;

reading a rendering request of a target pending component from the scheduling queue according to a position of the at least one pending component in the target page, a position of the target pending component in the target page meeting a preset condition;

rendering the target pending component according to the rendering data corresponding to the target pending component in the rendering request; and wherein the reading a rendering request of a target pending component from the scheduling queue according to the position of the at least one pending component in the target page comprises:

reading a rendering request of a target pending component from the scheduling queue according to a scheduling policy and the position of the at least one pending component in the target page, the target pending component being a pending component which will be rendered in priority as indicated by the scheduling policy; the scheduling policy comprises in-viewport first and First In First Out (FIFO), the in-viewport first having a higher priority than the FIFO.

2. The method of claim 1, wherein, in response to an existence of a rendering request of a pending component within the viewport of the target page in the scheduling queue, the target pending component is an in-viewport component among the at least one rendering component;

in response to an absence of a rendering request of a pending component within the viewport of the target page in the scheduling queue, the target pending component is a non in-viewport component that enters the scheduling queue in priority among the at least one pending component.

3. The method of claim 1, wherein in response to the target pending component comprising a first number of pending components, before rendering the target pending component according to rendering data corresponding to the target pending component in the rendering request, the method further comprises:

in response to the first number being more than a preset number threshold, determining a preset number threshold of pending components from the first number of pending components in the order of entering the scheduling queue;

the rendering the target pending component according to rendering data corresponding to the target pending component in the rendering request comprises:

rendering the preset number threshold of pending components in parallel according to rendering requests corresponding to the preset number threshold of pending components respectively.

4. The method of claim 1, wherein the method further comprises:

removing the rendering request of the target pending component from the scheduling queue and re-executing to read a rendering request of a target pending component from the scheduling queue according to the position of the at least one pending component in the target page until the rendering of the at least one pending component in the target page is completed.

5. The method of claim 1, wherein the method further comprises:

in response to the scheduling queue being empty, entering a dormant state and monitoring the scheduling queue at a preset frequency.

6. The method of claim 1, wherein before obtaining rendering data corresponding to at least one pending component in a target page, the method further comprises:

allocating a scheduling queue for the target page.

7. An electronic device, comprising:

a processor; and a memory coupled to the processor and having instructions stored therein, wherein the instructions, when executed by the processor, cause the electronic device to perform actions comprising:

obtaining rendering data corresponding to at least one pending component in a target page and adding a rendering request corresponding to the at least one pending component to a scheduling queue, the rendering request comprising the rendering data;

reading a rendering request of a target pending component from the scheduling queue according to a position of the at least one pending component in the target page, a position of the target pending component in the target page meeting a preset condition;

rendering the target pending component according to the rendering data corresponding to the target pending component in the rendering request; and wherein the reading a rendering request of a target pending component from the scheduling queue according to the position of the at least one pending component in the target page comprises:

reading a rendering request of a target pending component from the scheduling queue according to a scheduling policy and the position of the at least one pending component in the target page, the target pending component being a pending component which will be rendered in priority as indicated by the scheduling policy; the scheduling policy comprises in-viewport first and First In First Out (FIFO), the in-viewport first having a higher priority than the FIFO.

8. The device of claim 7, wherein, in response to an existence of a rendering request of a pending component within the viewport of the target page in the scheduling queue, the target pending component is an in-viewport component among the at least one rendering component;

in response to an absence of a rendering request of a pending component within the viewport of the target page in the scheduling queue the target pending component is a non in-viewport component that enters the scheduling queue in priority among the at least one pending component.

9. The device of claim 7, wherein in response to the target pending component comprising a first number of pending components, before rendering the target pending component according to rendering data corresponding to the target pending component in the rendering request, the method further comprises:

in response to the first number being more than a preset number threshold, determining a preset number threshold of pending components from the first number of pending components in the order of entering the scheduling queue;

the rendering the target pending component according to rendering data corresponding to the target pending component in the rendering request comprises:

rendering the preset number threshold of pending components in parallel according to rendering requests corresponding to the preset number threshold of pending components respectively.

10. The device of claim 7, wherein the method further comprises:

removing the rendering request of the target pending component from the scheduling queue and re-executing to read a rendering request of a target pending component from the scheduling queue according to the position of the at least one pending component in the target page until the rendering of the at least one pending component in the target page is completed.

11. The device of claim 7, wherein the actions further comprises:

in response to the scheduling queue being empty, entering a dormant state and monitoring the scheduling queue at a preset frequency.

12. The device of claim 7, wherein before obtaining rendering data corresponding to at least one pending component in a target page, the actions further comprises:

allocating a scheduling queue for the target page.

13. A computer program product tangibly stored in a computer storage medium and comprising machine-executable instructions that, when executed by a device, cause the device to perform a method comprising:

obtaining rendering data corresponding to at least one pending component in a target page and adding a rendering request corresponding to the at least one pending component to a scheduling queue, the rendering request comprising the rendering data;

reading a rendering request of a target pending component from the scheduling queue according to a position of the at least one pending component in the target page, a position of the target pending component in the target page meeting a preset condition;

rendering the target pending component according to the rendering data corresponding to the target pending component in the rendering request; and wherein the reading a rendering request of a target pending component from the scheduling queue according to the position of the at least one pending component in the target page comprises:

reading a rendering request of a target pending component from the scheduling queue according to a scheduling policy and the position of the at least one pending component in the target page, the target pending component being a pending component which will be rendered in priority as indicated by the scheduling policy; the scheduling policy comprises in-viewport first and First In First Out (FIFO), the in-viewport first having a higher priority than the FIFO.

14. The computer program product of claim 13, wherein, in response to an existence of a rendering request of a pending component within the viewport of the target page in the scheduling queue, the target pending component is an in-viewport component among the at least one rendering component;

in response to an absence of a rendering request of a pending component within the viewport of the target page in the scheduling queue, the target pending component is a non in-viewport component that enters the scheduling queue in priority among the at least one pending component.

15. The computer program product of claim 13, wherein in response to the target pending component comprising a first number of pending components, before rendering the target pending component according to rendering data corresponding to the target pending component in the rendering request, the method further comprises:

in response to the first number being more than a preset number threshold, determining a preset number threshold of pending components from the first number of pending components in the order of entering the scheduling queue;

the rendering the target pending component according to rendering data corresponding to the target pending component in the rendering request comprises:

rendering the preset number threshold of pending components in parallel according to rendering requests corresponding to the preset number threshold of pending components respectively.

16. The computer program product of claim 13, wherein the method further comprises:

removing the rendering request of the target pending component from the scheduling queue and re-executing to read a rendering request of a target pending component from the scheduling queue according to the position of the at least one pending component in the target page until the rendering of the at least one pending component in the target page is completed.

17. The computer program product of claim 13, wherein the method further comprises:

in response to the scheduling queue being empty, entering a dormant state and monitoring the scheduling queue at a preset frequency.

* * * * *